(12) United States Patent
Caren et al.

(10) Patent No.: US 6,446,642 B1
(45) Date of Patent: Sep. 10, 2002

(54) METHOD AND APPARATUS TO CLEAN AN INKJET REAGENT DEPOSITION DEVICE

(75) Inventors: Michael P. Caren, Palo Alto, CA (US); Carol T. Schembri, San Mateo, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/447,624

(22) Filed: Nov. 22, 1999

(51) Int. Cl.[7] .................................................. B08B 9/093
(52) U.S. Cl. ................ 134/22.18; 134/22.1; 134/22.12; 134/22.14; 347/22; 347/27; 347/28; 347/30; 347/85; 347/100
(58) Field of Search ............................ 134/22.14, 22.1, 134/22.18, 22.12, 184; 347/22, 27, 28, 30, 85, 100

(56) References Cited

U.S. PATENT DOCUMENTS

| | | | |
|---|---|---|---|
| 4,296,418 A | * 10/1981 | Yamazaki et al. | 346/75 |
| 4,849,769 A | 7/1989 | Dressler | 346/1.1 |
| 4,877,745 A | 10/1989 | Hayes et al. | 436/166 |
| 5,338,688 A | 8/1994 | Deeg et al. | 436/180 |
| 5,445,934 A | 8/1995 | Fodor et al. | 435/6 |
| 5,449,754 A | 9/1995 | Nishioka | 530/334 |
| 5,474,796 A | 12/1995 | Brennan | 427/2.13 |
| 5,574,485 A | 11/1996 | Anderson et al. | 347/27 |
| 5,589,861 A | 12/1996 | Shibata | 347/22 |
| 5,658,802 A | 8/1997 | Hayes et al. | 436/518 |
| 5,700,637 A | 12/1997 | Southern | 435/6 |
| 5,757,396 A | 5/1998 | Bruner | 347/27 |
| 5,777,648 A | 7/1998 | Scheffelin et al. | 347/87 |
| 5,786,829 A | 7/1998 | Pasciak, Jr. et al. | 347/28 |
| 5,807,522 A | 9/1998 | Brown et al. | 422/50 |
| 5,877,580 A | 3/1999 | Swierkowski | 310/328 |
| 5,923,347 A | 7/1999 | Wade | 347/28 |
| 5,929,878 A | 7/1999 | Pelletier | 347/28 |
| 6,001,309 A | 12/1999 | Gamble et al. | 422/100 |
| 6,123,412 A | 9/2000 | Yamamoto et al. | |
| 6,183,058 B1 * | 2/2001 | Sharma et al. | 347/28 |
| 6,238,868 B1 * | 5/2001 | Carrino et al. | 435/6 |

FOREIGN PATENT DOCUMENTS

| | | | |
|---|---|---|---|
| EP | 0292779 A1 | 11/1988 | B41J/3/04 |
| JP | 08085202 | 4/1996 | |
| JP | 10250060 | 9/1998 | |
| JP | 10250108 | 9/1998 | |
| JP | 10250110 | 9/1998 | |
| WO | WO 95/35505 | * 12/1995 | |
| WO | WO 98/44058 | * 10/1998 | |

OTHER PUBLICATIONS

Handbook of Semiconductor Wafer Cleaning Technology. Edited by W.Kern. Noyes Publications.ISBN 0–8155–1331–3. p. 24.*

* cited by examiner

*Primary Examiner*—Randy Gulakowski
*Assistant Examiner*—M. Kornakov
(74) *Attorney, Agent, or Firm*—Gordon M. Stewart (57) ABSTRACT

A method is described for removing residue from a fluid deposited on the interior surface of an inkjet printhead after the printhead has contained or dispensed the fluid at least once. The method makes use of a reverse flushing technique optionally used in combination with sonication. A cleaning station for flushing an inkjet printhead with a wash fluid, rinse fluid, and/or inert gas is provided as well.

24 Claims, 3 Drawing Sheets

METHOD AND APPARATUS TO CLEAN AN INKJET REAGENT DEPOSITION DEVICE

TECHNICAL FIELD

This invention relates to devices used in the deposition of fluids on substrate surfaces and more particularly relates to a method and apparatus for cleaning an inkjet printhead used, inter alia, in the fabrication of DNA arrays.

BACKGROUND

In the fields of chemistry, biochemistry, and molecular biology, there is a need to improve capabilities for carrying out large numbers of reactions using small quantities of materials. As a result, there is a significant and growing interest in employing array technologies where the arrays comprise an ever increasing number of distinct features on a relatively small substrate.

Many methods for making arrays of biological materials are currently available. Generally, DNA arrays are fabricated on a solid substrate by deposition of whole DNA oligomers or complementary DNA or by in-situ synthesis of DNA oligomers. Specific methods for fabricating biological arrays are summarized in international patent publication WO 95/35505. This reference discusses the "dot blot" technique in which a vacuum manifold transfers a number of DNA samples from circular wells to a porous membrane. In addition, DNA sequences can also be synthesized by using a photolithographic technique as discussed in U.S. Pat. No. 5,445,934 to Fodor et al., and by using a capillary dispenser tapping technique as discussed in U.S. Pat. No. 5,807,522 to Brown et al. All of these techniques suffer from inherent limitations that reduce the capacity for producing arrays accurately and reliably.

Arrays may be prepared by a variety of methods employed in the printing industry that do not suffer from the aforementioned limitations. U.S. patent applications Ser. Nos. 09/150,504 and 09/150,507 describe forming biomolecular arrays by novel methods and automated devices for moving a printhead over a print surface and for depositing the fluid composition at desired locations on the surface. Other devices used to dispense solutions are described in, for example, U.S. Pat. Nos. 5,658,802, 5,338,688, 5,700,637, 5,474,796, 4,877,745 and 5,449,754. In essence, inkjet printing processing as applied to array fabrication involves feeding a fluid composition into a dispensing chamber of an inkjet printhead and providing a stimulus repeatedly to cause the fluid composition to issue from a nozzle or orifice toward a substrate at desired locations, thus forming an array of features on the substrate surface.

Both non-uniformly deposited features and cross contamination in array fabrication can generate misleading data and thereby compromise experimental integrity. In addition, a problem with inkjet printheads in general is particulate buildup. Particulates may be introduced into an inkjet printhead when particulate-contaminated fluid is fed into printhead through a fill port as described in U.S. Pat. No. 5,777,648 to Scheffelin et al. Because the cross-sectional area of the dispensing orifice of a printhead tends to be smaller than the cross-sectional area of the fill port, it is possible to pass particulates through the fill port that cannot leave the printhead through the dispensing orifice. One way to minimize the introduction of unwanted particulate matter into the printhead is to load fluid into the printhead through the printhead's dispensing orifice. For example, U.S. patent applications Ser. Nos. 09/150,504 and 09/150,507 disclose the transfer of a fluid into a printhead through the printhead's dispensing orifice relying on capillary action.

Particulate buildup in the printhead is also problematic due to the repetitive nature of array fabrication. For example, when a biological array containing thousands of features is to be fabricated, the head will have to be loaded hundreds of times. During this process, the dispensing chamber of the head can become clogged with particulate matter. Especially during the wash out process, fluids tend to dry at the printhead nozzle leaving residue that was originally completely solvated or suspended as small non-agglomerated particulates in the fluid composition. When the nozzle becomes clogged with residue, droplets of fluid may fail to be fully ejected or to follow a desired trajectory. Thus, features become non-uniform in size and shape. Furthermore, once particulate matter becomes lodged within the printhead, the particulate matter provides an additional surface on which contaminants may be adsorbed or trapped thereby increasing the chance of cross contamination.

The predominant method of cleaning an inkjet printhead or "deposition device" is to flush a wash fluid through the deposition device after introducing the wash fluid via the fill port and out the dispensing orifice of the dispensing chamber. See, e.g., U.S. Pat. No. 5,589,861 to Shibata. However, the orifice of the dispensing chamber is quite small, and the orifice's smallest dimension is typically in the range of tens of microns. Therefore, the flow rate of the wash fluid is limited by the small size of the orifice in the printhead, and low flow rates limit the effectiveness of cleaning. When flow rate is in the laminar flow regime, as is typical with ordinary flushing methods, the velocity of the wash fluid at a surface where particulate matter adheres is theoretically zero. Flushing may also cause particulate matter left in the reservoir to be transported into the dispensing chamber. In addition, particulate matter may be simply too large to be passed through the dispensing orifice. Once trapped in the printhead, particulate matter may become further embedded in the inner wall of the inkjet printhead as the result of further flushing.

Another method of cleaning an inkjet head is through sonication. Sonication is a generally well known technique in inkjet printing technology. For example, U.S. Pat. No. 5,877,580 to Swierkowski teaches sonication as a part of a method to dispense chemical fluids 25 from a capillary device. In addition, JP08085202, JP10250060, JP10250108, and JP10250110 describe the use of sonication in conjunction with inkjet printing technology.

It is well known in the art that sonication may effectively result in disintegration of particulate matter or dislodging of particulate matter from the inner surface of a printhead. U.S. Pat. No. 5,574,485 to Anderson et al., for example, provides for a method in which a transducer having a cleaning fluid thereon is placed near a nozzle. A meniscus is formed with the cleaning fluid such that the meniscus bridges the gap between the transducer and the nozzle. Energizing the transducer causes ultrasonic cleaning of the portion of the nozzle contacted by the cleaning fluid. In addition, U.S. Pat. No. 5,757,396 to Bruner provides a method for sonicating ink-carrying channels within an inkjet printhead while purging the channels with ink. However, sonication by itself is typically only effective on surfaces in contact with the medium that couples the sonic energy with the surface, usually a liquid. Furthermore, there is no guarantee that sonication will disintegrate particulate matter too large to exit through the printhead orifice.

SUMMARY OF THE INVENTION

Accordingly, it is an object of the present invention to overcome the above-mentioned disadvantages of the prior art by providing a new and effective method to clean an inkjet printhead.

It is another object of the invention to provide such a method which allows one to dislodge and remove particulates too large to pass through a dispensing orifice of an inkjet printhead.

It is still another object of the invention to provide a such method wherein particulates are dislodged and removed through reverse flushing.

It is a further object of the invention to provide such a method wherein particulates are dislodged and removed though sonication.

It is yet a further object of the invention to provide such a method wherein the printhead is dried with a gas after cleaning.

It is still a further object of the invention to provide a cleaning station for use in carrying out the aforementioned method.

Additional objects, advantages and novel features of the invention will be set forth in part in the description which follows, and in part will become apparent to those skilled in the art upon examination of the following, or may be learned by practice of the invention.

In one aspect, then, the present invention relates to a method for removing residue that has been deposited on the interior surface of an inkjet printhead where the inkjet printhead has been loaded with or dispensed a fluid at least once. The printhead comprises a dispensing chamber, a reservoir in fluid communication with the dispensing chamber, and a dispensing orifice for dispensing fluid from the dispensing chamber. The method involves, initially, transferring a wash fluid through the dispensing orifice into the dispensing chamber. The wash fluid is suitable for removing any remaining fluid or residue therefrom from the interior surfaces of the printhead. Then, the wash fluid is emptied from the printhead. Optional steps include substantially preventing the wash fluid from flowing out of the printhead through the dispensing orifice after the wash fluid has been introduced into the printhead, rinsing with a rinse fluid capable of leaving no residue after emptying the wash fluid from the printhead and drying with a gas, e.g., an inert gas or dry clean air, after emptying the wash or rinse fluid from the printhead.

In another aspect, the present invention relates to a cleaning station for cleaning an inkjet printhead having dispensed a fluid at least once wherein the inkjet printhead comprises a reservoir, a dispensing chamber and a dispensing orifice as above. The cleaning station comprises a fluid transfer channel for transferring fluids or gases from one or more external sources through a transfer port into an inkjet printhead. In use, the transfer channel is placed against the printhead so that the transfer port and the dispensing orifice of the printhead are in fluid communication, enabling transfer of fluids and gases from the cleaning station into the dispensing chamber through the dispensing orifice. The cleaning station also comprises a wash fluid container for holding the wash fluid, an optional rinse fluid container for holding the rinse fluid, and an optional gas container for holding the inert gas or dry clean air, each capable of fluid communication the fluid transfer channel. Furthermore, the cleaning station comprises a vacuum pump that can be attached to the inkjet printhead for reducing pressure within the printhead such that fluid is drawn into the printhead through the transfer port and dispensing orifice of the printhead. A sealing material surrounding the periphery of the transfer port is provided to form a vacuum seal around the dispensing orifice. Optionally, the cleaning station further comprises means for sonicating the wash fluid.

Alternatively, the cleaning station can use a wash fluid holder (for example, a saturated capillary medium such as a sponge, or open container) which can be positioned such that wash fluid held therein is in communication with the dispensing chamber through the dispensing orifice (such as by being directly in contact with the orifice). Positioning can be accomplished, for example, by a suitable transporter which moves the printhead, fluid holder, or both of them. A pressure control system is provided to create a pressure differential across the dispensing chamber and orifice such that wash fluid in communication with the orifice is transferred through the dispensing orifice into the dispensing chamber. The pressure control system may include a positive pressure source acting on the wash fluid and/or a negative pressure source (which reduces pressure to less than atmospheric pressure) acting on the dispensing chamber (either of which source may, for example, be a pump).

In still another aspect, the present invention relates to a cleaning station as above except that the vacuum pump is replaced with a means to inject fluids or gases into the dispensing chamber through the dispensing orifice.

In a further aspect, the present invention relates to a cleaning station as above wherein the cleaning station further comprises a flexible capillary medium that assists in presenting or conveys the wash fluid to the printhead.

Particularly when the fluid contains a polymer (such as a polynucleotide) or a polymer precursor (such as a nucleoside compound which forms a unit of polynucleotides synthesized on a substrate from the nucleoside compounds), the same methods can be used but with wash fluid being transferred in any direction from the external source through the dispensing orifice and dispensing chamber (for example, from the dispensing orifice into the chamber or from the chamber through the orifice) into a waste line or waste container. As before, the wash fluid may be sonicated while the wash fluid is in contact with a surface of the printhead where cleaning is desired. Optionally, such a method may additionally include using the printhead to dispense droplets of the polymer or monomer to form at least a portion of an array (such as a polynucleotide array) prior to the wash fluid transfer and cleaning.

BRIEF DESCRIPTION OF THE FIGURES

The invention is described in detail below with reference to the following drawings.

DETAILED DESCRIPTION OF THE INVENTION

Before describing the invention in detail, it must be noted that, as used in this specification and the appended claims, the singular forms "a," "an," and "the" include plural referents unless the context clearly dictates otherwise. Thus, for example, reference to "a fluid" includes more than one fluid, reference to "a solvent" includes a mixture of solvents and the like.

In describing and claiming the present invention, the following terminology will be used in accordance with the definitions set out below.

The terms "clean" and "cleaning" refer to removing particulate matter or other residue from the inner surfaces of an inkjet printhead, as by chemical or mechanical means.

The term "fluid" as used herein describes matter that is substantially liquid. Fluids may contain minimally, partially or fully solvated solids. Examples of fluids include, without limitation, deionized water, salt water, alcohols, other organic solvents, and the like.

The term "fluid communication" refers to a state where fluid can flow from one element to another. For example, two sealed chambers with a common wall are rendered "in fluid communication" when an aperture is provided in the common wall to allow fluid to flow from one chamber to the other. Two open-ended tubes connected by a valve are in fluid communication when the valve is open.

The terms "inject" and "injection" are used herein to refer to pressuring a fluid so as to induce its directional flow. Injection does not necessarily imply physical penetration of an object. For example, a syringe injecting water through its tip into a chamber does not necessarily imply that the tip of the syringe penetrates the confines of the chamber.

The terms "particulates" or "particulate residue" are used to refer to solids, highly viscous liquids, residues and agglomerations thereof within an inkjet printhead that may impede proper dispensing function.

The term "polynucleotides" includes both naturally occurring polynucleotides and polynucleotides in which the conventional backbone has been replaced in whole or in part with a non-naturally occurring or synthetic backbone, and those in which one or more of the conventional bases have been replaced with a synthetic base capable of participating in Watson-Crick type hydrogen bonding interactions. Polynucleotides then, include compounds produced synthetically (for example, PNA as described in U.S. Pat. No. 5,948,902 and references cited therein) which can hybridize in a sequence specific manner analogous to that of tow naturally occurring polynucleotides. Polynucleotides include single or multiple stranded configurations, regardless of the source, where one or more of the strands may or may not be completely aligned with another. While probes and targets as may be described herein will typically be single stranded, this is not essential. A "nucleotide" refers to a sub-unit of a polynucleotide and has a phosphate group, a 5 carbon sugar and a nitrogen containing base, as well as analogs of such sub-units. An oligomer (such as an oligonucleotide) generally refers to a polymer of about 10 to 100 monomer units (such as nucleotides) in length, while a "polymer" (such as a polynucleotide) includes a multimer having any number of monomer units. Polynucleotides described herein, such as cDNA, typically have between 100 to 10000 monomer units. Examples of oligomers and polymers include polydeoxyribo-nu-cleotides, polyribonu-cleotides, polypeptides, polysaccharides, and other chemical entities that contain repeating units of like chemical structure.

The terms "sonicate" and "sonication" refer to vibrating or introducing vibrations in an object at ultrasonic frequencies. Ultrasonic frequencies are generally at least about 20 kHz and more particularly are in the range of approximately 40 kHz to 200 kHz. Sonication of an object may be achieved by applying direct mechanical action to an object or through coupling the object to ultrasonic waves with a coupling medium, typically a fluid.

The term "surfactant" is used herein to describe a compound capable of reducing the surface energy in the interface between a solid surface and a fluid, typically a liquid, to provide a higher degree of wetting of the surface by the fluid. Surfactants used herein include anionic, cationic, nonionic and amphoteric surfactants.

The present invention in general terms is directed to a method for cleaning an inkjet deposition device, i.e., an inkjet printhead, using a "reverse flushing" technique. Unlike ordinary "forward flushing" methods in which the wash fluid is flushed out of a printhead through its dispensing orifice, the present invention employs a "reverse flushing" process where the wash fluid initially enters the dispensing orifice of the printhead. The present invention further differs from ordinary forward flushing processes in that in a preferred embodiment of the present invention, the wash fluid is substantially prevented from leaving the printhead through the dispensing orifice, and the effectiveness of the reverse flushing process for cleaning the inkjet printhead is enhanced by sonication.

Figure 1:
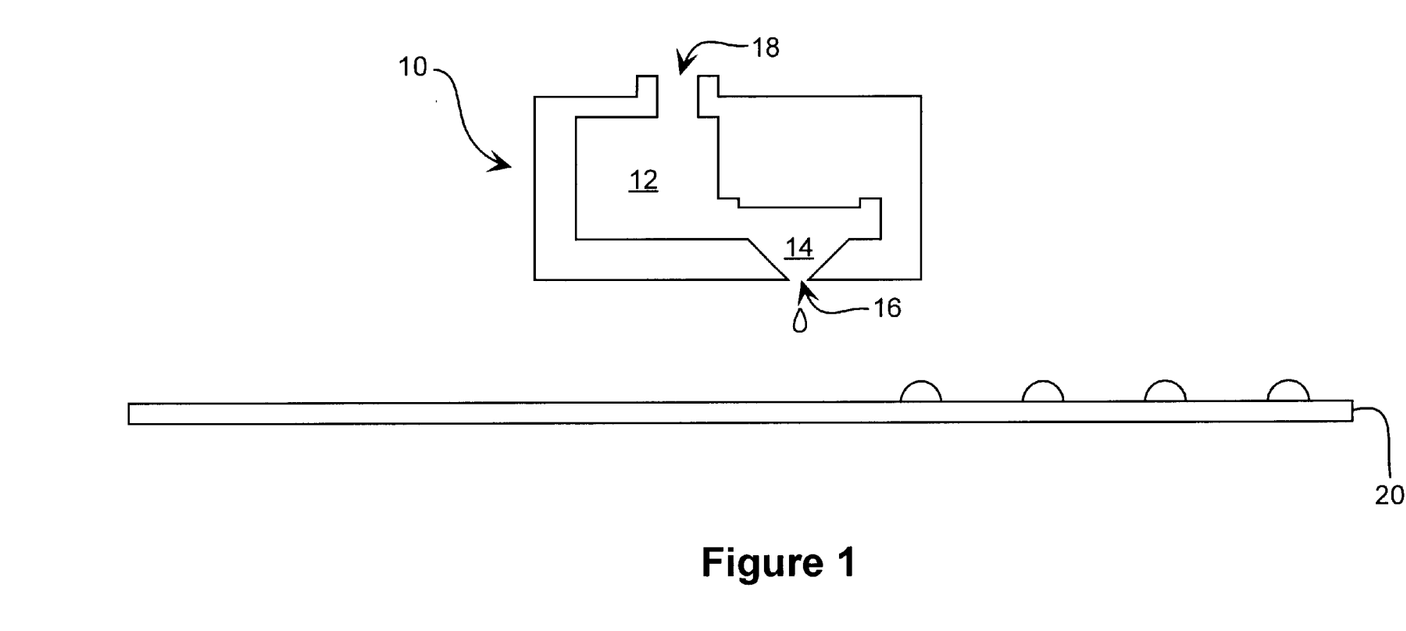
FIG. 1 schematically illustrates an inkjet printhead comprising a reservoir, a dispensing chamber and a dispensing orifice.

The invention is now described in detail herein with reference to the figures. FIG. 1 is a simplified schematic illustration of an inkjet printhead 10, comprising a reservoir 12 for holding a supply of fluid. The reservoir 12 may comprise a single chamber, as illustrated in FIG. 1, or it may comprise multiple chambers for holding a plurality of fluids. The reservoir 12 is in fluid communication with a dispensing chamber 14 disposed within the printhead. As shown, the dispensing chamber 14 also is a part of the reservoir 12. Alternatively, the dispensing chamber 14 may be physically separated from the reservoir 12, but in such a case a means for ensuring fluid communication between the two would be required. In addition, the printhead 10 comprises a dispensing orifice 16 in fluid communication with the dispensing chamber 14. Typically, a fill port 18 is provided in fluid communication with the reservoir 12, and, in use, sample fluid is typically loaded into the reservoir 12 through the fill port 18. Depending on the design of the printhead 10 and the properties of the fluid to be dispensed, however, fluid can also be loaded into the reservoir 12 through the dispensing orifice 16. When the printhead 10 is in operation, the fluid from the reservoir 12 flows into the dispensing chamber 14 where energy is applied to the fluid. The energy can be applied in a variety of ways, such as through piezoelectric or thermal means. As a result, fluid is ejected from the dispensing chamber 14 through the dispensing orifice 16. The design of typical inkjet printheads orients the dispensing orifice 14 opposite a substrate 20 such that the fluid to be dispensed is ejected onto the substrate 20. Once the printhead 10 has been engaged in operation, i.e., the fluid has been either loaded or fired through the dispensing orifice 16 at least once, the fluid will have wetted the inner surfaces of the reservoir 12, the dispensing chamber 14, and the dispensing orifice 16. The printhead 10 must therefore be cleaned in order to be used with different fluid without cross contamination.

As shown in FIG. 1, the typical fill port 18 has a much larger diameter than the smallest dimension of the typical dispensing orifice 16. Typical dispensing orifice sizes for inkjet printheads are in the order of tens of microns while fill ports can be as large as or larger than thousands of microns. Thus, particulates larger than the dispensing orifice 16 can be introduced into the printhead 10 through the fill port 18. In turn, the dispensing orifice 16 can act as a filter for the exiting fluid by retaining particulates, agglomerates, impurities or other solids in the inkjet printhead 10. Once a particulate is lodged within the dispensing orifice 16, the particulate is subject to forces resulting from the flow of fluid from further operation of the printhead 10. In addition, if the fluid is a solution in which solids are solvated, the particulate may nucleate and grow in size as liquid is evaporated from the dispensing orifice 16. Evaporation may occur in almost any type of printheads, but may be particularly problematic in thermal inkjet printheads under certain conditions. Thus, a trapped particulate may become tightly jammed and embedded within the dispensing orifice 16 or the dispensing chamber 14.

While the present invention may be used to clean inkjet printheads having only one dispensing orifice, the invention can be also employed to clean other types of printheads. For example, printheads may have more than one orifice or dispensing chamber where the orifices may be disposed on a common surface. The applicability of the invention to such alternative printhead configurations will be apparent to one of ordinary skill in the art given the following description of the invention as pertaining to an inkjet printhead having a single dispensing orifice.

Figure 2:
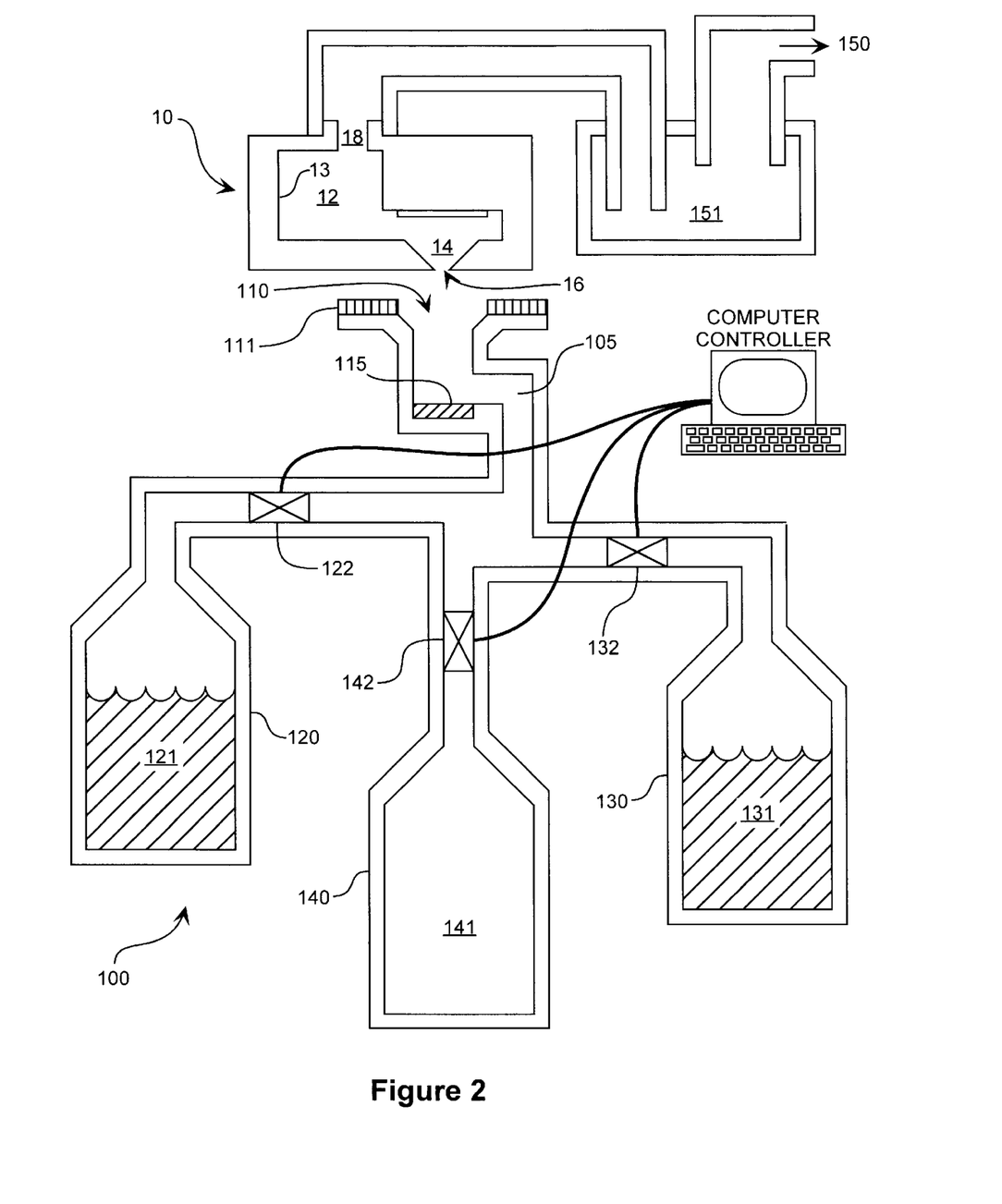
FIG. 2 schematically illustrates an inkjet printhead in combination with a cleaning station of the invention.

To clean the printhead 10 and thereby remove embedded particulates, a cleaning station 100 may be used as shown in FIG. 2. A cleaning station 100 of the present invention comprises a transfer channel 105 for transferring fluids from one or more external sources though transfer port 110 into inkjet printhead 10. In use, the transfer channel 105 is placed against printhead 10 so that the transfer port 110 and the dispensing orifice 16 of the printhead 10 are in communication, enabling transfer of fluid from the cleaning station 100 into the dispensing chamber 14 through the dispensing orifice 16. The transfer port 110 has a sealing material 111 around the periphery thereof thereon capable of forming a vacuum or other type of seal or gasket around the dispensing orifice 16. The sealing material 111 can comprise a variety of materials including, but not limited to, natural and synthetic rubbers such as poly(styrene-butadiene rubber), poly(butadiene), poly(ethylene-propylene), silicone elastomers, polyurethanes and the like. In addition, a wash fluid container 120 is provided for holding a wash fluid 121 and capable of fluid communication with the transfer port 110.

FIG. 2 shows a version of a cleaning station of the present invention. In FIG. 2, a cleaning station 100 is shown with three containers or sources of fluids, a wash fluid container 120, a rinse fluid container 130, and a gas container 140. Each of these three containers is connected to the transfer port 110 through the fluid transfer channel 105 by a separate valve. These valves can be any number of types including, without limitation, ball, gate and solenoid valves. The default position for all three valves is closed. During operation of the cleaning station, the valves are controlled such that no two valves are open at the same time. Electronic means (as shown) are a preferable means to provide selectable control of these valves. Thus, at most only one container is in fluid communication with the fluid transfer channel 105 at a time. Furthermore, the cleaning station 100 can be used in combination with vacuum means 150 to generate a vacuum or reduce the pressure within the printhead 10, such as a house vacuum or vacuum pump. Methods and means for generating a vacuum or reducing the pressure within the printhead 10 will be readily apparent to those of ordinary skill in the art. Numerous vacuum technologies and associated literature are widely and commercially available. In the present invention, a vacuum is generally applied to the reservoir 16, i.e., a house vacuum or vacuum pump is connected to the fill port 18 of the inkjet printhead 10 to reduce the pressure within the inkjet printhead 10. A waste collection vessel 151 may be provided to collect the matter that is drawn out of the printhead by the vacuum means 150.

In operation, the transfer port 110 is placed against the inkjet printhead 10 such that the fluid transfer channel 105 extends from dispensing orifice 16. As shown in FIG. 2, the sealing material 111 surrounds the dispensing orifice 16 to form a barrier capable for holding a vacuum. In addition, the wash fluid container 120 is filled with a wash fluid 121 and deployed in a manner such that the wash fluid 121 can flow through the transfer port 110. As shown in FIG. 2, fluid communication is achieved between the wash fluid container 120 and the transfer port 110 when a wash fluid valve 122 between the wash fluid container 120 and the transfer port 110 is opened. When a vacuum is generated within the printhead 10, the wash fluid 121 is drawn from the wash fluid container 120 through the wash fluid valve 122, the transfer port 110 and the dispensing orifice 16 into the dispensing chamber 14 of the printhead 10. The flow of the wash fluid 121 tends to dislodge and suspend particulate matter adhering to the inner surface of the printhead 10 as well as those trapped in the dispensing orifice 16. Once wash fluid 121 is introduced into the printhead 10, it is desirable to prevent the wash fluid 121 from later flowing out of the inkjet printhead 10 through the dispensing orifice 16, since there may be suspended residue particulates left in the wash fluid 121, and the particulates may again be lodged in the dispensing orifice 16. This can be done by ensuring that the vacuum remains engaged and that no net force is applied to the wash fluid 121 in the dispensing direction. Alternatively, a wash fluid 121 can be chosen such that capillary forces are employed prevent the wash fluid 121 from exiting therethough. The wash fluid 121 should be emptied from the printhead 10 without allowing a substantial portion of the wash fluid 121 to flow through the dispensing orifice 16 again. Preferably, no more than a minority portion of the wash fluid is removed through the dispensing orifice. More preferably, no more than about 20 volume percent of the wash fluid is removed through the dispensing orifice. Still more preferably, no more than about 10 volume percent of the wash fluid is removed through the dispensing orifice.

In certain instances, a sample fluid to be deposited by a printhead may be loaded into the printhead through the printhead's dispensing orifice. See, e.g., U.S. patent applications Ser. Nos. 09/150,504 and 09/150,507. In such a case, vacuum means may be employed to draw the sample fluid into the printhead. Such vacuum means may also be used to draw wash or rinse fluid for cleaning the interior surfaces of the printhead. However, because loading and cleaning often require different flow rates, a proportional valve disposed between the vacuum means and the printhead may be used to regulate the flow rate of the fluid drawn into the printhead. Usually, the sample fluid is loaded into the printhead at a slower rate than the rate at which a wash or rinse is drawn into the printhead for cleaning purposes.

When particulate matter strongly adheres to inner surfaces 13 of the printhead 10 or is tightly lodged within the dispensing orifice 16, sonication may be desirable in addition to reverse flushing as described above. Sonication is a well known art, and many commercial ultrasonic devices are available and can be adapted to the present invention. Sonication can be applied to the printhead 10 through direct mechanical action or preferably by using the wash fluid 121 as a coupling medium. While the wash fluid 121 is in contact with the desired surfaces for cleaning, the wash fluid 121 is sonicated by an ultrasonic transducer 115. The location of the ultrasonic transducer 115 is not critical and may be placed wherever effective to cause cavitation at the surfaces to be cleaned and to dislodge the particulate residue adhered thereto. Sonication should be applied for a time period sufficient to ensure that no particulate matter remains lodged within the printhead. Typically, sonication should be applied for about one second or less to dislodge particulate matter, longer if desired. Once particulate matter, is dislodged, it is suspended by the wash fluid 121 and flushed out of the inkjet head 10 with the wash fluid. The printhead 10 can be sonicated anytime while a wash fluid is in contact with the surfaces to be sonicated, before, during or after reverse flushing. Sonication may additionally enhance the removal of nonsolid matter such as residual fluid by improving overall cleaning dynamics.

Figure 3:
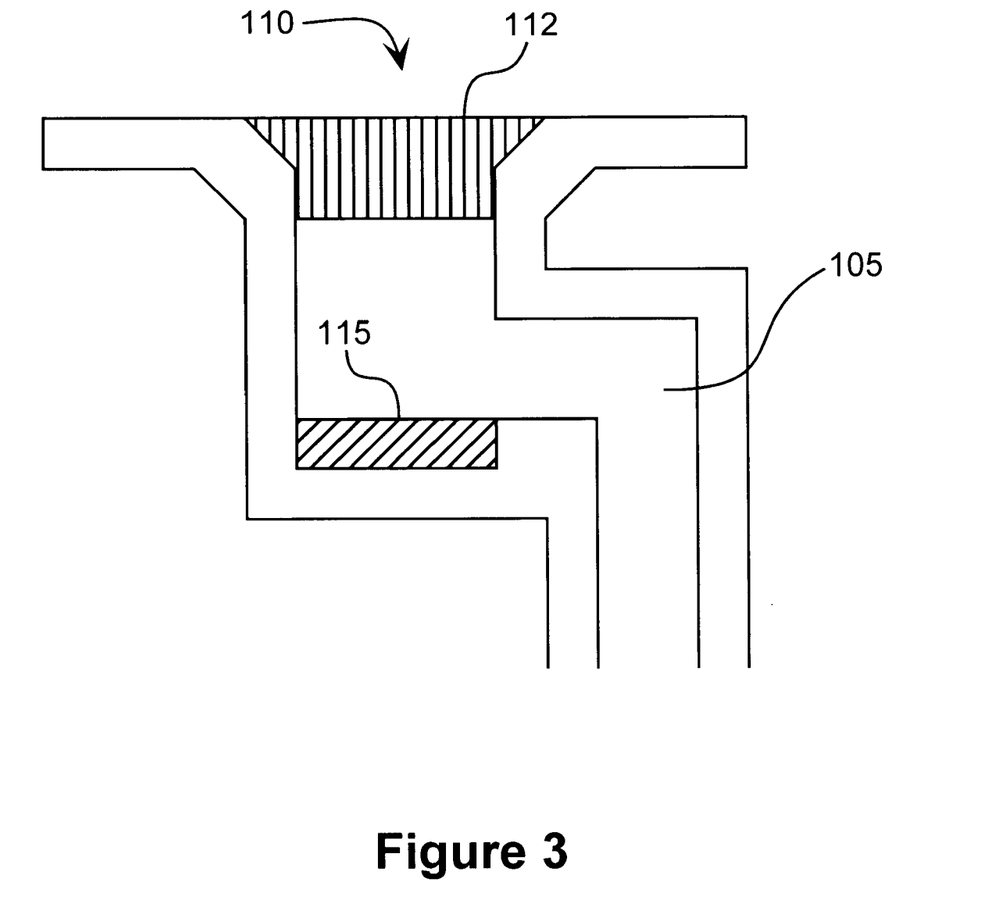
FIG. 3 schematically illustrates the use of a flexible capillary medium to assist in presenting or conveying a fluid to the dispensing orifice of a printhead.

Optionally, a reverse flow sponge touch method can be additionally employed to present or convey wash or rinse fluid to the dispensing orifice. FIG. 3 shows a capillary medium 112 disposed within a transfer port 110 that is in fluid communication with a fluid transfer channel 105. An ultrasonic transducer 115 is located within the fluid transfer channel 105. In operation, the capillary medium 112 presents the wash fluid to the printhead allowing it to draw the fluid into the printhead. Typical capillary media is sufficiently soft or flexible such that contact with the dispensing orifice will not result in damage. In addition, capillary medium must be wettable and have a sufficiently large surface area on which wicking of fluids may occur. When the wash or rinse fluid is an aqueous fluid, the medium should have sufficient hydrophillic properties to act as a sponge to hold the wash or rinse fluid. Such materials are generally known in the art. In addition, the material should have sufficient mechanical integrity such that little or preferably no additional particulate matter is introduced into the cleaning process, i.e., the medium should not shed. The flexible capillary medium may be in a variety of forms that includes, but not limited to, porous pads, bristles, webbing, cloth, and fabric. The medium 112 may also help couple the sonic energy generated by the ultrasonic transducer 115 to the printhead 10. When a flexible capillary medium is employed, a seal is not necessarily required for the cleaning station.

It should be emphasized that it is not necessarily possible to eliminate the problem of particulate buildup by attempting to eliminate particulate matter from the fluid to be deposited. First, very little fluid is used to deposit features in the formation of an array; typically, the starting volume in the reservoir is in the range of microliters and each feature requires only tens or hundreds of picoliters of fluid. Filtration may not be practical with such a small volume. Second, when the printhead is used to deposit biochemical agents, the fluid may contain biomolecules such as oligonucleotides, polynucleotides, oligopeptides, polypeptides, proteins or other bioorganic or organic materials, typically in a buffered aqueous fluid containing anionic and cationic species such as sodium, potassium, lithium, calcium, magnesium, zinc, nitrates, sulfates, phosphates, citrates, bromides, chlorides, fluorides and the like. When water is evaporated from such a solution, salts and other crystals can precipitate out of the fluid, thereby depositing particulate matter within the printhead. Third, the printhead, fluid lines, air, valves and all other parts of the system can be sources of contamination. In other words, even if particulate matter can be eliminated from the fluid before the fluid is loaded into the printhead, particulate matter can still be formed within the printhead.

With the above understanding of the problem of particulate buildup, it is evident that the preferred wash fluid comprises a liquid that will dissolve all solid materials from the fluid remaining in the printhead 10. Residue is solvated when the residue has a similar solubility parameter as the solvent. For example, a protein typically will have a similar solubility parameter as another protein, and thus one protein will typically solvate another protein.

Similarly, a hydrocarbon will tend to solvate another hydrocarbon. Because ionic species such as salt precipitates are highly polar in nature, a polar solvent must be selected to solvate ionic fluid residues. Solvents that have sufficient polarity to solvate ionic species typically employed in fluids used in fabrication of nucleic acid arrays include water, alcohols, ketones, dimethylsulfoxide, dimethylformamide and the like. Where the fluid contains a mixture of polar and non-polar components, alcohol can be a suitable wash fluid. Generally, any alcohol is suitable that has a hydroxyl group appended to a branched or unbranched saturated hydrocarbon that is a liquid at room temperature. More particularly, lower alcohols such as methanol, ethanol, isopropanol, and the like are optional wash fluids.

The preferred wash fluid comprises water. Because water is a component of many biomolecule-containing fluids, using water as a wash fluid reduces the likelihood of contamination should any wash fluid remain in the printhead after cleaning. In addition, water has excellent properties as a solvent to dissolve salt residues that typically accumulate in a printhead during typical biochemical array fabrication. Furthermore, water is available in high purity at low cost in addition to being safer and more environmentally acceptable than flammable organic solvents. Optionally, the wash fluid may also contain a surfactant and/or an organic component to help couple water to surfaces that are not readily wetted by water.

If a rinsing step is desired following the initial wash step, a rinse fluid container 130 for holding a rinse fluid 131 and capable of fluid communication with the transfer port 110 is provided, as shown in FIG. 2. First, fluid communication should cease between the wash fluid container 120 and the transfer port 110 before rinsing. Thus, the wash fluid valve 122 should be closed. Then, the rinse fluid container 130, filled with a rinse fluid 131, is deployed in a manner such that the rinse fluid container 30 fluidly communicates the transfer port 110. Thus, the rinse fluid valve 132 disposed between the rinse fluid container 130 and the transfer port 110 is opened. The vacuum generated within the printhead 10 draws the rinse fluid 131 from the rinse fluid container 130 through the transfer port 110 and the dispensing orifice 16 into the dispensing chamber 14 of the printhead 10. Then rinse fluid 131 should be emptied from the printhead 10. While no particulate matter should remain in the printhead 10 after the wash fluid 121 has been emptied from the printhead, one may further safeguard against reintroduction of particulate matter into the dispensing orifice 16 by ensuring that the rinse fluid 131 does not exit the printhead through the dispensing orifice 16. This can be done using the same methods as described above for preventing the wash fluid from flowing out of the printhead through the dispensing orifice, i.e., by ensuring that the vacuum remains engaged and that no net force is applied to the rinse fluid 121 in the dispensing direction or by employing a rinse fluid 121 such that capillary forces exert a force on the rinse fluid and thereby preventing the wash fluid 121 from exiting therethough.

The rinse fluid is selected such that it is able to remove any remaining wash fluid residue in the printhead. In addition, the rinse fluid should not itself leave any residue within the printhead after drying. Thus, fluids containing solids, solvated or non-solvated, and liquids that are non-volatile, are generally unsuitable for rinsing. Examples of suitable rinse fluids include, but are not limited to, pure deionized water, pure alcohols, and mixtures thereof. The preferred rinse fluid may also contain other inert liquids that vaporize as readily as or more readily than water without residue.

After washing or rinsing, the present invention optionally includes a drying step to remove all unwanted fluids from the printhead. There are at least three methods to dry the printhead. In one, heat is applied to evaporate any residual fluid by using ordinary radiant energy sources such as heat lamps, ovens or the even printhead itself if the printhead is capable of producing thermal energy. In another, a vacuum is imposed on printhead by placing the printhead in a vacuum chamber. The preferred method is to expose wet surfaces within the printhead to a flow of a gas, either an inert gas or clean dry air. In this method, a gas container for holding a gas suitable for drying the printhead is provided. However, the gas can be from any number of sources. Referring to FIG. 2, after washing and/or rinsing, all valves should be closed except for the gas valve 142 disposed between the gas container 140 and the transfer port 110. This can be accomplished through computerized controls. Thus, of the three containers shown in FIG. 2, only the gas container fluidly communicates with the fluid transfer channel 105. The vacuum within the printhead 10 and/or the pressure form the gas container draws the gas 141 from the gas container 140 through the transfer channel 105, transfer port 110, and the dispensing orifice 16 into the dispensing chamber 14 of the printhead 10. Then, gas 141, which is either an inert gas or dry clean air, is passed over the interior surfaces 13 of the inkjet printhead 10 that were contacted by the wash fluid 121 to dry the surfaces. Suitable inert gases include, without limitation, nitrogen, argon, helium, gaseous perfluorinated alkanes and ethers, gaseous chlorofluorocarbons and the like. The preferred inert gas is nitrogen. Alternatively, the gas can be introduced thorough the fill port of a printhead to dry the interior surfaces of the printhead (not shown). In such a case, one of ordinary skill would adjust the set up of the cleaning station accordingly.

In the preferred embodiment as described above, the present invention makes use of a house vacuum or a pump that can draw the wash fluid, and optionally the rinse fluid and gas, through the dispensing orifice of the printhead. In another embodiment, the invention does not necessarily include a vacuum. Rather, a means for injecting a fluid into the printhead through the dispensing orifice of the printhead is provided. The means for injecting fluid may comprise a device as simple as a plunger to one as complex as a compressor to pressurize and inject fluid into the dispensing orifice. Because compressors apply a positive pressure to force fluids into the printhead through the dispensing orifice, a seal to prevent fluid leakage is preferred. A vacuum seal is not necessarily needed when a vacuum is not employed. Alternatively, means for transferring fluid may comprise both a vacuum and positive to enhance the flow rate of the fluid.

Variations on of the present invention will be apparent to those of ordinary skill in the art. For example, heat may be applied to the inkjet printhead or the wash fluid to increase cleaning efficiency. In addition, the preferred electronic means as discussed above that may be included as a part of the clean station to provide selectable control of valves may be adapted for other purposes.

It is to be understood that while the invention has been described in conjunction with the preferred specific embodiments thereof, that the foregoing description is intended to illustrate and not limit the scope of the invention. Other aspects, advantages and modifications within the scope of the invention will be apparent to those skilled in the art to which the invention pertains.

All patents, patent applications, and publications mentioned herein are hereby incorporated by reference in their entireties.

What is claimed is:

1. A method for removing residue deposited on the interior surface of a printhead, comprising the steps of:
   (a) providing a printhead having dispensed or contained a fluid at least once, the printhead comprising a dispensing chamber and a dispensing orifice for dispensing fluid from the dispensing chamber,
   (b) transferring a wash fluid from an external source through the dispensing orifice into the dispensing chamber, the wash fluid being suitable for cleaning the fluid from the printhead; and
   (c) emptying the wash fluid from the printhead;
      the method further comprising, during or subsequent to step (b), sonicating the wash fluid while the wash fluid is in contact with a surface of the printhead where cleaning is desired.

2. The method of claim 1 wherein the printhead is an inkjet printhead.

3. The method of claim 2 wherein the inkjet printhead is a thermal inkjet printhead.

4. The method of claim 1 further comprising, before step (c), preventing most of the wash fluid from leaving the printhead through the dispensing orifice.

5. The method of claim 1 wherein the wash fluid comprises water.

6. The method of claim 1 wherein the wash fluid comprises a surfactant.

7. The method of claim 1 wherein the wash fluid comprises an alcohol.

8. A method for removing residue deposited on the interior surface of a printhead, comprising the steps of:
   (a) providing a printhead having dispensed or contained a fluid at least once, the printhead comprising a dispensing chamber and a dispensing orifice for dispensing fluid from the dispensing chamber,
   (b) transferring a wash fluid from an external source through the dispensing orifice into the dispensing chamber, the wash fluid being suitable for cleaning the fluid from the printhead; and
   (c) emptying the wash fluid from the printhead;
      wherein the step of transferring the wash fluid through the dispensing orifice into the dispensing chamber comprises:
         reducing the pressure within the printhead to less than atmospheric pressure such that wash fluid flows from the external source toward and through dispensing orifice.

9. The method of claim 1 further comprising, after step (c), the steps of:
   (d) providing a rinse fluid suitable for rinsing the printhead;
   (e) transferring the rinse fluid through the dispensing orifice into the dispensing chamber; and
   (f) emptying the rinse fluid from the printhead.

10. The method of claim 9 wherein the rinse fluid is capable of leaving no residue after drying.

11. The method of claim 10 wherein the rinse fluid is selected from the group consisting of deionized water, alcohol, and combinations thereof.

12. The method of claim 1 further comprising, after step (c), flowing a gas through the printhead to dry the printhead.

13. The method of claim 12, wherein the gas is an inert gas.

14. The method of claim 13, wherein the inert gas is nitrogen.

15. The method of claim 12, wherein the gas is dry clean air.

16. The method of claim 1, wherein the fluid in (a) comprises a biomolecule-containing buffer solution.

17. The method of claim 16 wherein the biomolecule comprises an oligonucleotide, polynucleotide, oligopeptide or polypeptide.

18. A method according to claim 1 wherein wash fluid is transferred by a cleaning station from an external source through the dispensing orifice into the dispensing chamber, which cleaning station includes means to sonicate the wash fluid.

19. A method according to claim 18 wherein the cleaning station includes a fluid transfer channel through which the wash fluid is provided through the dispensing orifice and into the dispensing chamber, and wherein the means to sonicate the wash fluid is positioned in the fluid transfer channel.

20. A method according to claim 18 wherein the cleaning station includes a fluid transfer channel through which the wash fluid is provided through the dispensing orifice and into the dispensing chamber, the method additionally comprising loading the fluid dispensed by the printhead into the printhead through the printhead's dispensing orifice.

21. A method according to claim 8 wherein the pressure is reduced by a negative pressure source acting on the dispensing chamber.

22. A method according to claim 20 additionally comprising, before step (c), preventing most of the wash fluid from leaving the printhead through the dispensing orifice.

23. A method according to claim 1 additionally comprising using the printhead to dispense droplets of polymers to form at least a portion of an array prior to the wash fluid transfer.

24. A method according to claim 1 wherein the sonicating of the wash fluid is performed during the transfer of wash fluid.

* * * * *